(12) United States Patent
Rodriguez (10) Patent No.: US 9,360,375 B2
(45) Date of Patent: Jun. 7, 2016

(54) PHOTON RADIATION DETECTOR COMPRISING AN ARRAY OF ANTENNAS AND A SPIRAL RESISTIVE SUPPORT

(71) Applicant: COMMISSARIAT A L'ENERGIE ATOMIQUE ET AUX ENE ALT, Paris (FR)

(72) Inventor: Louis Rodriguez, Orsay (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 14/603,592

(22) Filed: Jan. 23, 2015

(65) Prior Publication Data
US 2015/0211936 A1    Jul. 30, 2015

(30) Foreign Application Priority Data
Jan. 30, 2014   (FR) .................................... 14 50731

(51) Int. Cl.
| G01J 5/00 | (2006.01) |
| G01J 5/20 | (2006.01) |
| G01J 5/02 | (2006.01) |
| G01J 4/04 | (2006.01) |
| G01J 5/08 | (2006.01) |
| G01J 5/22 | (2006.01) |
| G01J 5/24 | (2006.01) |

(52) U.S. Cl.
CPC .... G01J 5/20 (2013.01); G01J 4/04 (2013.01); G01J 5/02 (2013.01); G01J 5/0837 (2013.01); G01J 5/22 (2013.01); G01J 5/24 (2013.01)

(58) Field of Classification Search
CPC ...................................... G01J 5/02; G01J 5/20
See application file for complete search history.

(56) References Cited

U.S. PATENT DOCUMENTS

2011/0057107 A1*  3/2011  Agnese ..................... G01J 5/08
                                                              250/338.3
2014/0175284 A1*  6/2014  Roh ....................... G01J 5/0853
                                                              250/338.4

FOREIGN PATENT DOCUMENTS

WO        97/21250 A1    6/1997
WO    2011/048170 A1    4/2011

OTHER PUBLICATIONS

G.D. Boreman, "Infrared microantennas," 1997, SPIE Proceedings, vol. 3110, pp. 882-885.*
W.C. Jones et al., "A Polarization Sensitive Bolometric Receiver for Observations of the Cosmic Microwave Background", Proceedings of SPIE, vol. 4855, (2003), pp. 227-238.

(Continued)

Primary Examiner — Kiho Kim
(74) Attorney, Agent, or Firm — Oblon, McClelland, Maier & Neustadt, L.L.P.

(57) ABSTRACT

A photon radiation detector including a support forming a plane spiral with at least four arms, each arm being suspended between a first end common to the four arms and a second end, each arm including a resistive material, the resistivity of which varies as a function of a temperature of the resistive material, and which is electrically connected to the first and second ends of said arm, and a first array of antennas sensitive to a first physical parameter of the photon radiation and in thermal contact with the resistive material of two of the four arms, called first arms, wherein the second end of said each arm of the at least four arms is electrically connected to a read circuit of the detector and thermally bonded to a first heat sink.

22 Claims, 6 Drawing Sheets

(56) References Cited

OTHER PUBLICATIONS

C.L. Kuo et al., "Antenna-Coupled Tes Bolometer Arrays for Cmb Polarimetry", Millimeter and submillimeter detectors and instrumentation for astronomy n °4, (2008), vol. 7020, 14 pages.

D.H. Martin et al., "Polarised Interferometric Spectrometry for the Millimetre and Submillimetre Spectrum", Infrared Physics, vol. 10, 1969, pp. 105-109.

French Preliminary Search Report issued Nov. 13, 2014, in Patent Application No. FR 1450731, filed Jan. 30, 2014 (with English Translation of Category of Cited Documents).

* cited by examiner

PHOTON RADIATION DETECTOR COMPRISING AN ARRAY OF ANTENNAS AND A SPIRAL RESISTIVE SUPPORT

TECHNICAL FIELD AND PRIOR ART

The invention relates to a photon radiation detector, especially used in the field of thermal imaging, to measure the components of the photon radiation. The invention advantageously applies for measurements of wavelengths from the infrared radiation, for example of about 1 μm, up to the centimetric waves, for example of about 1 cm. The invention especially allows the simultaneous measurement of at least any two components of the photon radiation, and is advantageously used to perform a simultaneous homogeneous measurement of both orthogonal components of the linear polarization of the photon radiation such as the transverse electrical and magnetic modes of the light. The invention may enable military or civil observations to be performed, for example in the medical field or that of the semiconductor technology.

A measurement of the light polarization, from the infrared up to the centimetric waves, is for example implemented to perform a direct measurement of the polarization of the light emitting object or of the medium through which this light goes through, or, by the use of the polarized wave, in order to facilitate spectroscopic measurements, as is the case in the Martin-Puplett type interferometers.

To perform such a measurement, the light is generally separated into two components by an optical element acting on the polarization of the received light (stretched lead wires, birefringent plate, etc.), both these components being subsequently simultaneously analysed by two detection planes (sensitive to the total intensity), each being intended to measure one of both components, both these detection planes being for example disposed one facing the other or one perpendicular to one another. This space shifting of both detection planes however implies the use of a significant volume in order to be able to dispose both detection planes according to the desired configuration.

It is possible to have only one detection plane by resorting to a modulator (half-wave plate, rotating polarizer, Faraday rotator, etc.). However, the measurement of the different components is carried out in this case at different times.

Detectors sensitive to both polarization components, called Polarization Sensitive Bolometers, PSB, are used in astronomy for the simultaneous measurement of both polarization components of the cosmic microwave background radiation, as described in the document "A Polarisation Sensitive Bolometric Receiver for Observations of the Cosmic Microwave Background" by Jones W. C. et al., Proceedings of the SPIE, vol. 4855, pp. 227-238 (2003). This type of detector comprises a stack of two crossed detection layers made of resistive wires adapted to the impedance of empty space. In order to optimize the radiation absorption, a reflector or "backshort", is used to form a resonant cavity adapted to $\lambda/4$, with $\lambda$ corresponding to the wavelength intended to be detected. However, in such a configuration, the difference in position of both detection layers with respect to the reflector induces a difference in the spectral range measured by each of the detection layers.

In order to perform a simultaneous measurement of both polarization components on a same plane with detectors manufactured by a collective process, a matrix of detectors made by a lithographic process enabling two crossed arrays of antennas to be associated with two thermal sensors of the Transition Edge Sensor (TES) type operating around a hundred millikelvin is proposed in the document "Antenna-Coupled TES Bolometer Arrays for CMB Polarimetry" by C. L. Kuo et al., Millimeter and submillimeter detectors and instrumentation for astronomy n° 4, Marseilles, France (2008), vol. 7020, pp. 702011.1. In the device described by this document, each detector, which forms a pixel of the matrix, comprises dipole antennas formed and connected to each other by electrically lead wires running on the whole surface of the pixel. A material layer is present at the front face of each pixel and openings are made through this material layer as slots through which the portions of the lead wires forming the antennas absorb the energy of the received radiation. The dimensions of the slots are adapted to the wavelengths intended to be detected. The energy absorbed by the antennas is then dissipated at a supraconductor element located on the side of the pixel.

This device however has several drawbacks. Indeed, in order to ensure a great detection sensitivity, the absorbed power must be dissipated in a load resistor located on the bolometric sensor, or thermometer, which is offset with respect to the antennas. The compactness of the device is therefore not optimized. Furthermore, for the transport of this induced current to be made without too many losses, the lead wires have low impedances per unit length leading to a mismatch of the antennas with respect to the detected wave because of the resonance phenomena due to the poor adaptation to the empty space. Moreover, the material present at the front face of the detector, which is necessary to mask the parts of the lead wires used to connect the antennas of a same pixel to one another and in which the slots are made, disturbs the absorption of photons by the antennas and creates cross-coupling between the antennas, therefore diminishing the efficiency of the device.

DISCLOSURE OF THE INVENTION

Thus there is a need to provide a photon radiation detector which cannot have the drawbacks of the prior art detectors, that is the compactness of which is optimized in order to exhibit the largest possible detector surface, without mismatch of antennas with respect to the detected wave nor cross-coupling between the antennas, and enabling one or more physical parameters or components of the photon radiation to be measured without a space or time shifting in the measurements performed.

To this end, one embodiment provides a photon radiation detector, comprising at least:

- a support forming a plane spiral with at least four arms, each arm being suspended between a first end common to the four arms and a second end, each arm comprising at least one resistive material the resistivity of which varies as a function of its temperature and which is electrically connected to the first and second ends of said arm,
- a first array of antennas sensitive to at least one first physical parameter of the photon radiation and in thermal contact with the resistive material of two of the four arms, called first arms, and wherein the second end of each arm is electrically connected to a read circuit of the detector and thermally bonded to a first heat sink.

In this detector, the light absorption by the antennas causes a temperature rise of the resistive material of the supporting structure, corresponding to the support, due to the heat transfer between the antenna and the resistive material of the support. This leads to a modification in the electrical resistance presented by the resistive material from which the characteristics of the photon radiation intended to be measured are determined.

The spiral formed by the support enables a homogeneous disposition of the antennas at the whole surface of the detector while ensuring only one crossing between the arms of the spiral, especially between the first arms and the other two arms of the spiral.

Furthermore, given that the antennas are directly in thermal contact with the resistive material of the detector, the heat is locally dissipated and carrying a current induced by the detection made by the antennas is avoided. This enables a mismatch of the antennas with respect to the detected wave to be prevented because of the resonance phenomena due to the poor adaptation to the empty space of lead wires having low impedances per unit length just like in the prior art devices. The structure of this detector further enables a material layer not to be used in order to mask parts of lead wires acting to connect the antennas of a same pixel to one another given that the antennas are in thermal contact with the resistive material acting as a thermometer material of the detector.

At each of the first arms, each of the antennas of the first array of antennas may form a stack of materials comprising at least the material of the antennas and the resistive material of the first arms.

The suspended structure of the antenna support enables all the electrical connections to be disposed between the antennas and the read circuit, with the advantage that any disturbance regarding the detector that could be caused by lead wires passing on the same plane as the absorbing elements is avoided.

The second ends of the arms are thermal bonded to a first heat sink, which allows a proper measurement of the device resistance given that both ends form thermal references of the detector.

The first end common to the four arms of the spiral formed by the support may correspond to the centre of the spiral.

The first end common to the four arms may be thermally bonded to a second heat sink. Thus, by thermally bonding the first end common to the four arms to the second heat sink, the thermal reference frames used to detect the photon radiation, and therefore the accuracy of the measurement made by the detector are improved. This thermal bond enables the heat to be evacuated from the first end towards the second heat sink. In addition, the combination of a first array of antennas, that is several antennas arranged according to an array, in thermal contact with the resistive material of the first arms, and a first end common to the four arms thermally bonded to the second heat sink gives to the detector the possibility to tune the wavelength(s) intended to be detected thanks to the choice of dimensions and shape of each antenna.

The first end common to the four arms may be electrically connected to the read circuit. Thus, electrically connecting the first end common to the four arms to the read circuit contributes to eliminating all the outer and inner electrical disturbances on the resistance measurements of each of the spiral arms. This electrical connection further sets the electrical potential of the first end common to the four arms, thus improving the signal measurement.

The first heat sink and the second heat sink may correspond to a same heat sink formed by a same element of the detector.

The first heat sink and/or the second heat sink may be formed by the read circuit. The first heat sink and/or the second heat sink may be formed by one or more cooling elements of the detector, forming a cold source.

The thermal bond between the first end common to the four arms and the second heat sink and/or the electrical connection between the first end common to the four arms and the read circuit may be formed by a first block also forming a first mechanical bearing between the support and the read circuit.

The second end of each arm may be electrically connected to the read circuit and/or thermally bonded to the first heat sink by a second block forming a second mechanical bearing between the support and the read circuit.

Alternatively, the mechanical bearing, thermal conduction and electrical conduction functions described above may be performed respectively by different blocks in order to uncouple the constraints on these blocks.

The detector may further comprise a second array of antennas sensitive to at least one second physical parameter of the photon radiation and in thermal contact with the resistive material of the other two of the four arms, called second arms.

The first and second physical parameters may be two components of the photon radiation or two different wavelengths of the photon radiation. Such detector can detect two different colours.

The first and second physical parameters may be two components orthogonal to one another of a linear polarization of the photon radiation (such as the transverse electrical and magnetic modes), the antennas of the first array of antennas may be dipole antennas formed by first segments of an electrically conductive material directed parallel to a first direction, the antennas of the second array of antennas may be dipole antennas formed by second segments of an electrically conductive material directed parallel to a second direction, the first and the second directions may be substantially perpendicular to one another, and a length of each of the first segments and the second segments may be substantially equal to half a wavelength of the photon radiation intended to be detected by the antennas of the first array of antennas and the antennas of the second array of antennas, respectively. Such a detector allows a homogeneous and simultaneous detection of both orthogonal components of the photon radiation polarization, whatever the size of the detector.

In this case, a length of each of the first segments may be substantially equal to a length of each of the second segments.

Alternatively, each of the antennas of the first and second arrays of antennas may comprise two segments having substantially similar dimensions and crossing substantially perpendicular to one another at their centre by forming a cross pattern, and a length of each of the segments of the antennas may be substantially equal to half a wavelength of the photon radiation intended to be detected.

In this case, the length of each of the segments of each of the antennas of the first array of antennas may be substantially equal to the length of each of the segments of each of the antennas of the second array of antennas (with in this case a detection of a same wavelength by both arrays of antennas), or the length of each of the segments of each of the antennas of the first array of antennas may be different from the length of each of the segments of each of the antennas of the second array of antennas (with in this case a detection of two different wavelengths by the two arrays of antennas).

The resistive material of the other two of the four arms, called second arms, may be in thermal contact with no antenna.

In this case, each of the antennas of the first array of antennas may comprise two segments having substantially similar dimensions and crossing substantially perpendicular to one another at their centre by forming a cross pattern, and a length of each of the segments of the antennas may be substantially equal to half a wavelength of the photon radiation intended to be detected. Such a configuration enables the common mode signal detected by the second arms to be discriminated from the photon radiation detected at the first two arms comprising the first array of antennas.

The antennas of the first array of antennas may be disposed on the first arms and/or the antennas of the second array of antennas may be disposed on the second arms.

The support may comprise silicon further forming the resistive material, and/or the antennas of the first and/or second arrays of antennas may comprise at least one metal or supraconductor or semiconductor material.

The surface resistance of each of the antennas of the first and/or second arrays of antennas may be between about 20Ω and 2000Ω, and/or the surface resistance of the resistive material may be higher than about 10 kΩ/square.

The detector may further comprise a reflector disposed between the antennas and the read circuit such that a distance between the reflector and the antennas is equal to about a quarter wavelength of the photon radiation intended to be detected. Under the antennas, an optical cavity adapted to λ/4 is thus formed.

The detector may further comprise one or more portions of a dielectric material disposed between the antennas and the resistive material of the support.

Another embodiment relates to a device for detecting a photon radiation, comprising a matrix of detectors such as described previously.

The detector can be used for different applications, such as for example:
  infrared imaging: measurement of the polarization which enables the contrast of the measured scene to be increased, in particular by selective elimination of the reflections on objects the viewing angle of which with respect to the source modifies the content of the different components of the polarization;
  spectro-imaging: in a Martin-Puplett type Fourier transform spectrometer performing imaging. Matrices of detectors sensitive to both components of the polarization then enable the signal-to-noise ratio to be increased without having to deploy two independent devices (focal planes). This allows a considerable volume gain and has a very positive impact on the power budget of systems needing to be cooled;
  astrophysics: measurement of the polarization associated with the fluctuations of the cosmic microwave background. The patterns in the 3K radiation map described by the polarization are traces of the essential gravitational waves which have been exerted during the first instants of the Universe, and which are described by an inflation phase. The structuration of galaxies over time is partly explained by the presence of a magnetic field which affects the flows of ionized cold matter. Unfortunately, the magnetic field can only be indirectly traced. A light emission of cold matter, in the submillimetric field, is affected by the presence of this magnetic field by favouring a component of the polarization. The measurement of the emitting imbalance enables not only the direction of the magnetic field in which this matter is immersed to be traced back but also its intensity.

BRIEF DESCRIPTION OF THE DRAWINGS

The present invention will be better understood upon reading the description of exemplary embodiments given merely as an indication and in no way limiting with reference to the accompanying drawings in which.

Identical, similar or equivalent parts of the different figures described thereafter bear the same reference numerals so as to facilitate switching from one figure to another.

The different parts represented in the figures are not necessarily drawn to a uniform scale, in order to make the figures more legible.

The different possibilities (alternatives and embodiments) must be understood as being not mutually exclusive and can be mutually combined.

DETAILED DISCLOSURE OF PARTICULAR EMBODIMENTS

A photon radiation detector 100 is first described according to a first embodiment.

In this first embodiment, the detector 100 is intended to detect first and second physical parameters of the photon radiation, called light, corresponding to two components orthogonal to one another, of the light linear polarization, that is the polarization planes of which are perpendicular to one another, here corresponding to the transverse electrical and magnetic modes of the light.

The detector 100 comprises a first array of antennas 102 intended to detect a first one of two components of the light linear polarization, and a second array of antennas 104 intended to detect a second one of both components of the light linear polarization.

Figure 1:
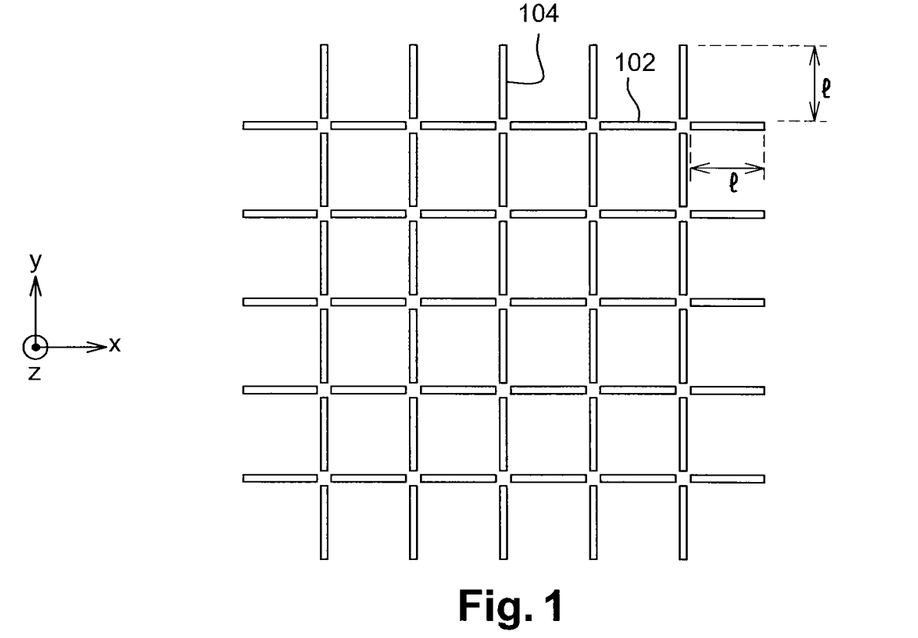
FIG. 1 shows a top view of an exemplary embodiment of first and second arrays of antennas of a photon radiation detector according to a first embodiment.

FIG. 1 shows a top view on an exemplary embodiment of the first array of antennas 102 and the second array of antennas 104.

The antennas 102 of the first array correspond to dipole antennas each formed by a first segment of an electrically conductive material. The first segments forming the antennas 102 are all directed parallel to a same axis, that is they all have their largest dimension directed along a same direction (parallel to the axis X in the example of FIG. 1). Moreover, the antennas 102 are aligned by forming several rows parallel to one another and evenly spaced from one another. The first array of antennas 102 here enables an absorption of the "horizontal" component of the light wave polarization to be performed, that is the component the polarization plane of which is parallel to the plane (X,Z).

The antennas 104 of the second array correspond to dipole antennas each formed by a second segment of an electrically conductive material. The second segments forming the antennas 104 are all directed parallel to a same axis, that is they all have their largest dimension directed along a same direction (parallel to the axis Y in the example of FIG. 1). Moreover, the antennas 104 are aligned by forming several columns parallel to one another and evenly spaced from one another. The second array of antennas 104 therefore enables here an absorption of the "vertical" component of the light wave polarization to be performed, that is the component the polarization plane of which is parallel to the plane (Y,Z).

The antennas 102 are directed perpendicular to the antennas 104 in order to perform the measurement of the transverse electrical and magnetic modes of the light. The first and second arrays of antennas 102, 104 therefore form a set of crossed dipole antennas, forming a grid pattern in the plane (X,Y) which is perpendicular to both polarization planes of the light components intended to be detected. This disposition is due to the fact that the antennas of each of the first and second arrays of antennas are disposed on a support forming a spiral pattern with four arms which is detailed thereafter.

In the exemplary embodiment described here, the first and second segments all have a same length since the antennas 102 and 104 are intended to detect the components of a same wavelength. The length "l" of each of the first and second segments is equal to about half the wavelength ($\lambda/2$) of the light intended to be detected by the detector 100. Alternatively, the first segments of an electrically conductive material forming the antennas 102 can have a length different from that of the second segments of an electrically conductive material forming the antennas 104.

The surface resistance of each of the antennas 102 and 104, in the detection direction (parallel to the axis X for the antennas 102 and parallel to the axis Y for the antennas 104) is in direct relation with the impedance of empty space (377 $\Omega$/square in the presence of a resonant cavity as described later, or 188 $\Omega$/square without a resonant cavity). For reasons relating to impedance adaptation, and in order to have a local dissipation in each of the antennas 102 and 104, the surface resistance of each antenna 102 and 104 is between about 20 and 2000 $\Omega$/square.

The electrically conductive material forming the antennas 102 and 104 can correspond to a metal material (for example Au, Cu, Bi, Al and Ti), or a supraconductor material (for example a TiN, NbTi, TiAu, MoAu type alloy), or even a semiconductor material (for example doped Ge or doped Si).

The number of antennas 102 and 104 of the detector 100 depends on the size of the detector 100 and on the wavelength intended to be detected. Each of the first and second arrays of antennas 102 and 104 comprises for example a number of antennas between 2 and 50.

The detector 100 further comprises a support 106 on which the first array of antennas 102 and the second array of antennas 104 are disposed. The support 106 here acts both as a mechanical support for the antennas 102 and 104, and as a resistive element forming the thermometer of the detector 100. To perform both functions, the support 106 comprises a material having a mechanical strength, or rigidity or stiffness, which is sufficient to hold the antennas 102 and 104 substantially in a same plane (which is parallel to plane (X,Y)), but also the resistivity of which varies as a function of its temperature, for example doped silicon. The support 106 can be produced by etching a silicon layer. For some applications such as the photon radiation detection in the FIR (far infrared), submillimetric or millimetric field, the support 106 is advantageously produced from a SOI (silicon on insulator) type substrate by deposition and etching of the silicon.

The antennas 102 and 104 are electrically insulated from the support 106 by an insulating material 108, for example $SiO_2$, disposed between the antennas 102, 104 and the support 106.

The support 106 forms a set of horizontal beams (parallel to the axis X) and vertical beams (parallel to the axis Y) connected to one another by forming a plane spiral with four arms or four branches. Thus, the antennas 102 and 104 are homogeneously distributed on the whole detection surface of the detector 100.

Figure 2:
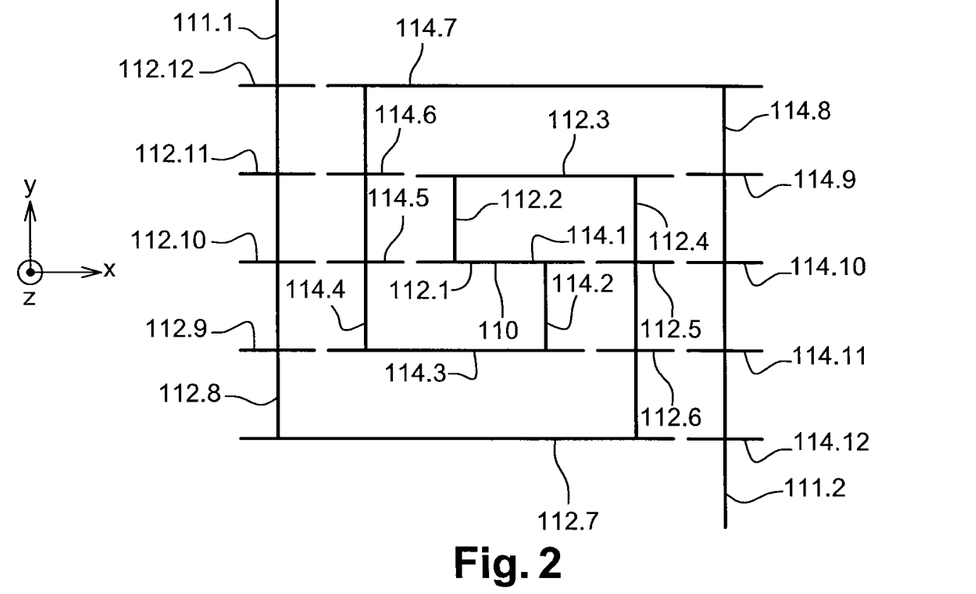
FIG. 2 shows a top view of a first part of the support of the photon radiation detector according to a first embodiment, on which the first array of antennas is intended to be performed.

FIG. 2 shows a first part of the support 106 on which the antennas 102 of the first array are disposed. Reference 110 refers to the centre of the spiral formed by the support 106. This first part of the support 106 comprises portions of material, or beams, extending parallel to the antennas 102 and on which the antennas 102 are disposed, as well as portions extending perpendicular to the antennas 102 in order to form an electrical, thermal and mechanical continuity according to a pattern corresponding to a first spiral with two arms, these two arms each extending from a first end corresponding to the centre 110 to a second end referenced 111.1 and 111.2 respectively. In the example of FIG. 2, one of both arms of the first spiral is formed, starting from the centre 110 to the second end 111.1, by the portions of the support 106 bearing the references 112.1 to 112.12, and the other one of both arms of the first spiral is formed, from the centre 110 to the second end 111.2, by the portions of the support 106 bearing the references 114.1 to 114.12.

Figure 3:
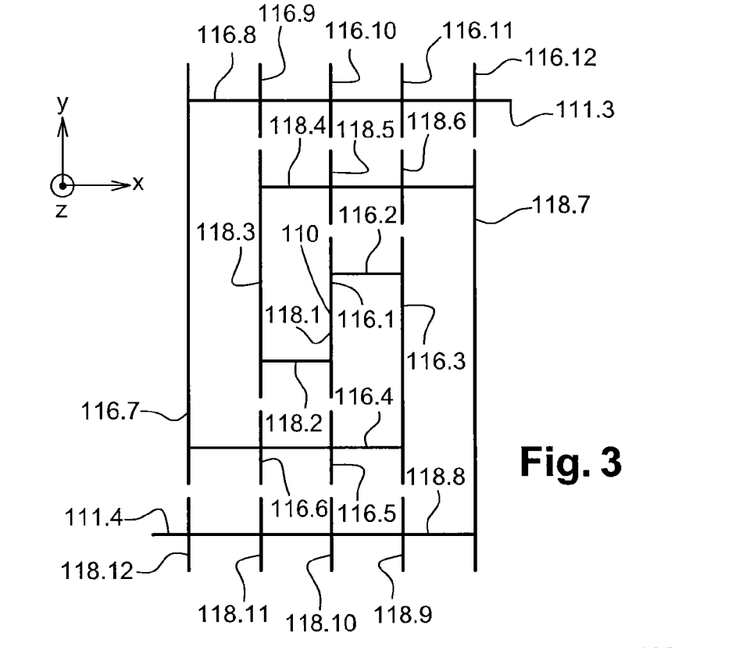
FIG. 3 shows a top view of a second part of the support of the photon radiation detector according to the first embodiment, on which the second array of antennas is intended to be performed.

FIG. 3 shows a second part of the support 106 on which the antennas 104 of the second array are disposed. This second part of the support 106 comprises portions of material, or beams, extending parallel to the antennas 104 and on which the antennas 104 are disposed, as well as portions extending perpendicular to the antennas 104 in order to form an electrical, thermal and mechanical continuity according to a pattern corresponding to a second spiral with two arms, these two arms each extending from a first end corresponding to the centre 110 (corresponding to the same point as the centre 110 described previously in relation to FIG. 2) to a second end respectively referenced 111.3 and 111.4. In the example of FIG. 3, one of both arms of the second spiral is formed, starting from the centre 110 to the second end 111.3, by the portions of the support 106 bearing the references 116.1 to 116.12, and the other one of both arms of the spiral is formed, from the centre 110 to the second end 111.4, by the portions of the support 106 bearing the references 118.1 to 118.12.

Figure 4:
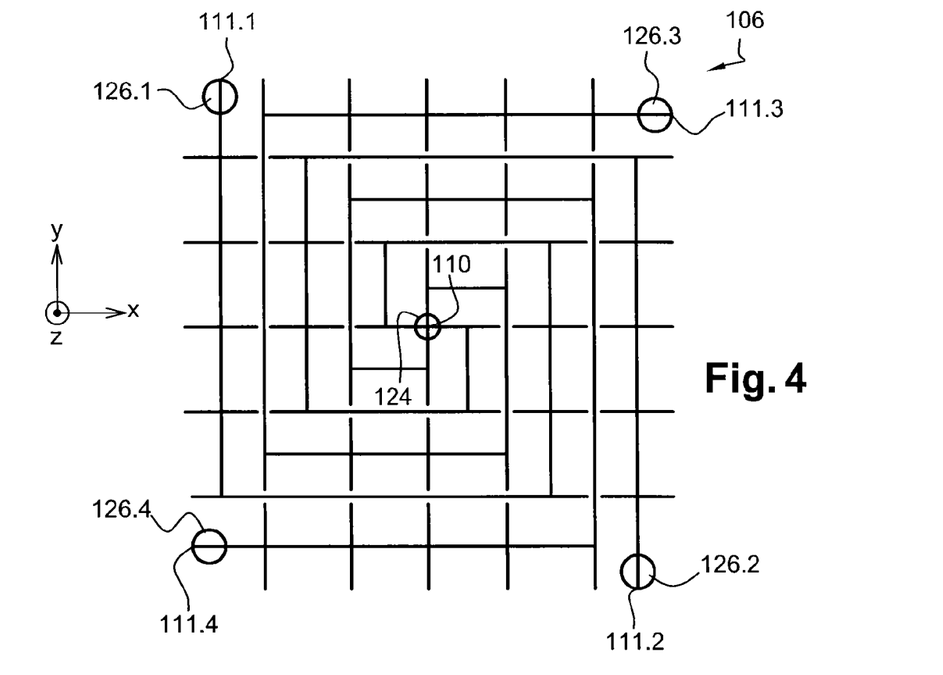
FIG. 4 shows a top view of the whole support of the photon radiation detector according to the first embodiment.

The support 106 corresponds to the joining, in a same plane, of both parts described previously in relation to FIGS. 2 and 3. The support 106 is shown as a whole in FIG. 4. Thus, the different elements of the support 106 form together a spiral with four arms corresponding to the joining of the first spiral with two arms and the second spiral with two arms described previously. The centre 110 corresponds to the only crossing point between the first part of the support 106 described in relation to FIG. 2 and the second part of the support 106 described in relation to FIG. 3. This centre 110 therefore forms the only mechanical, electrical and thermal bond point between both parts of the support 106, and therefore between both arrays of antennas 102 and 104.

Given that the antennas 102 and 104 are disposed on the support 106, the portions of material of the support 106 preferably have a surface resistance higher than about 10 k$\Omega$/square in order to prevent the operation of the antennas 102, 104 they support from being disturbed.

Figure 5:
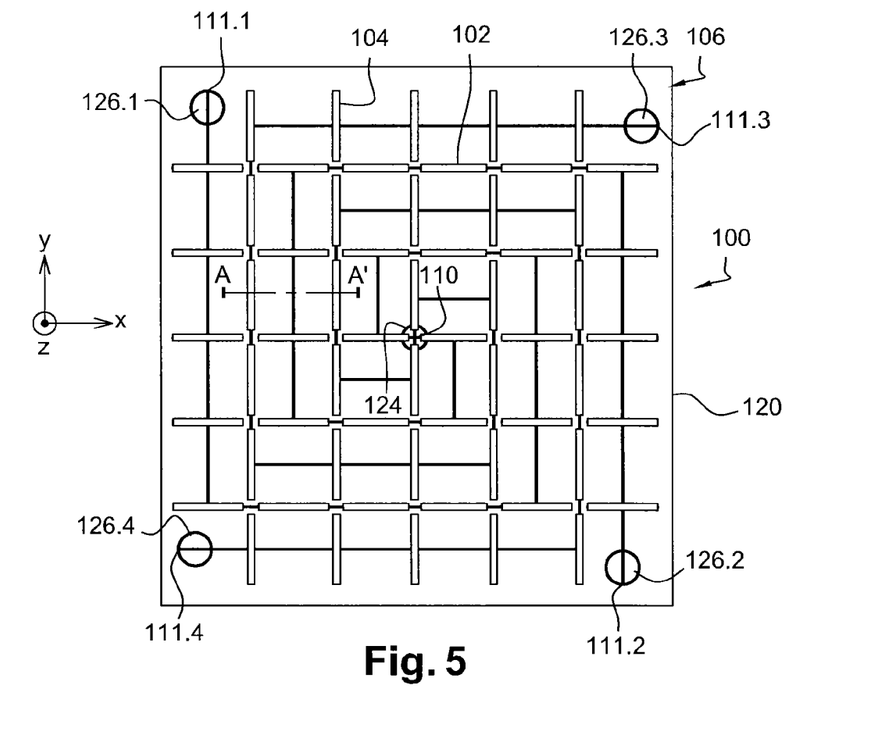
FIG. 5 shows a top view of the photon radiation detector according to the first embodiment.
Figure 6:
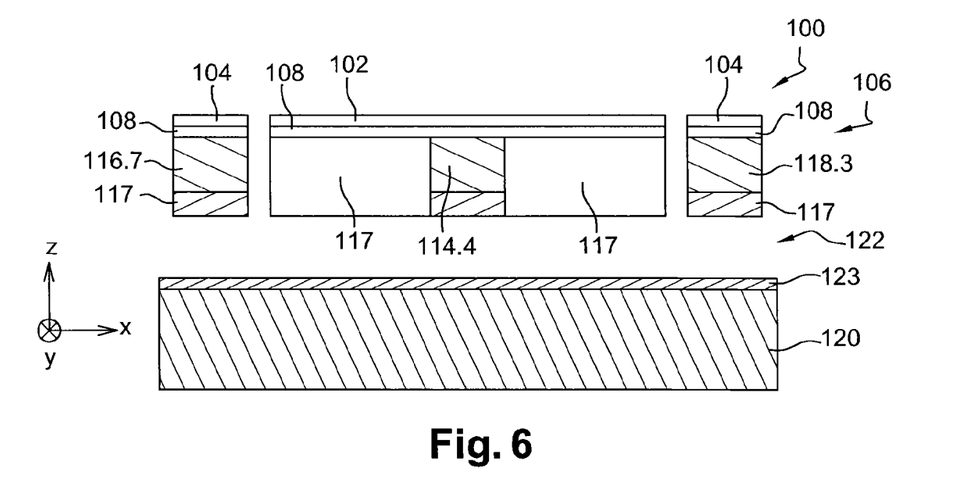
FIG. 6 shows a cross-section side view of a part of the photon radiation detector according to the first embodiment.

FIG. 5 shows a top view of the detector 100 comprising the support 106 on which the first array of antennas 102 and the second array of antennas 104 are disposed. FIG. 6 corresponds to a cross-section side view of a part of the detector 100 along the segment AA' which can be seen in FIG. 5.

In the example of FIG. 6, the resistive elements forming the thermometer of the detector 100 rest on the portions of material 117 of the support 106 fulfilling the function of mechanical bearing for the support 106. Such a configuration of the support 106 is advantageous when the detector 100 is intended to be used for high temperature applications (for example equal to or higher than about 77K).

The detector 100 further comprises a substrate comprising a read circuit 120 and which is disposed on the support 106 such that an optical cavity 122 is formed between the support 106 and the read circuit 120. The support 106 is advantageously mechanically bonded to an upper face of the read circuit 120 by a first block 124 extending perpendicular to the plane in which lies the support 106 (perpendicular to the plane (X,Y)). This first block 124 mechanically supports the support 106 at the centre 110, that is at the first ends of the four arms of the spiral formed by the support 106, and is here also in electrical and thermal contact with the support 106 at its centre 110. Since the centre 110 forms the only mechanical, electrical and thermal bond point between both parts of the support 106, and therefore between both arrays of antennas 102 and 104, this only crossing point especially prevents the overheating of one of the arrays of antennas 102, 104 by the other given the very low thermal coupling between the arms on which both arrays of antennas 102 and 104 are disposed. In this exemplary embodiment, in addition to the function of mechanical bearing fulfilled by the first block 124, the latter also forms a thermal bond between the centre 110 and a heat sink formed by the read circuit 120. Moreover, the first block 124 can also be electrically conductive and form an electrical connection between the centre 110 and the read circuit 120.

The support 106 is also mechanically bonded to the upper face of the read circuit 120 by four second blocks 126.1 to 126.4, here electrically conductive and extending perpendicular to the plane in which lies the support 106 (perpendicular to the plane (X,Y)), and mechanically supporting the support 106 at the second ends 111.1-111.4 of the four arms of the spiral formed by the support 106. The four second electrically conductive blocks 126.1 to 126.4 are in thermal and electrical contact with the support 106, and each form a thermal bond and an electrical connection between one of the arms of the spiral and the read circuit 120 which forms a heat sink to which the second ends 111.1-111.4 are thermally bonded. The second blocks 124 and 126.1-126.4 therefore form anchor points for the support 106 on the read circuit 120. The second electrically conductive blocks 126.1-126.4 are made of a material which is resistive enough (at the scale of the detected wave) in order not to disturb the wave absorption by the antennas 102, 104, but comparatively not much resistive with respect to the resistance values of the arms of the spiral formed by the support 106 so as not to distort the reading value of the resistances of these arms, for example. The blocks 124 and 126.1-126.4 are for example made of copper, coated or not with at least one supraconductor material, of gold, or of any other good conductive dense material, or even of silicon or silica.

The first block 124 forms a thermal bond with a heat sink of the detector 100 to which the first ends of the arms of the spiral are connected, this heat sink being coupled to the cold source of the detector 100 corresponding to the substrate and more particularly the read circuit 120. The four second electrically conductive blocks 126.1 to 126.4 form electrical connections and thermal bonds between each of the second ends of the arms of the spiral and the read circuit 120. Each arm of the spiral formed by the support 106 is then suspended between its first end (common to the four arms and corresponding to the centre of the spiral) and its second end, the mechanical bearings of the support 106 being formed by the first block 124 and the second blocks 126.1-126.4.

With such a detector 100, the light received by the arrays of antennas 102 and 104 is absorbed by the latter. This light absorption by the antennas 102, 104 causes a temperature rise of the bearing structure of the antennas 102, 104, that is of the arms of the spiral formed by the support 106, due to the heat transfer between the antennas 102, 104 and the support 106. Given the resistive character of the material (here silicon) with which the support 106 is formed, the electrical resistance of each of the arms formed by the support 106 then varies according to the heat produced by the antennas being on each of the arms. The values of both components of the light linear polarization can then be deduced from the values of these variations of electrical resistance.

Figure 7:
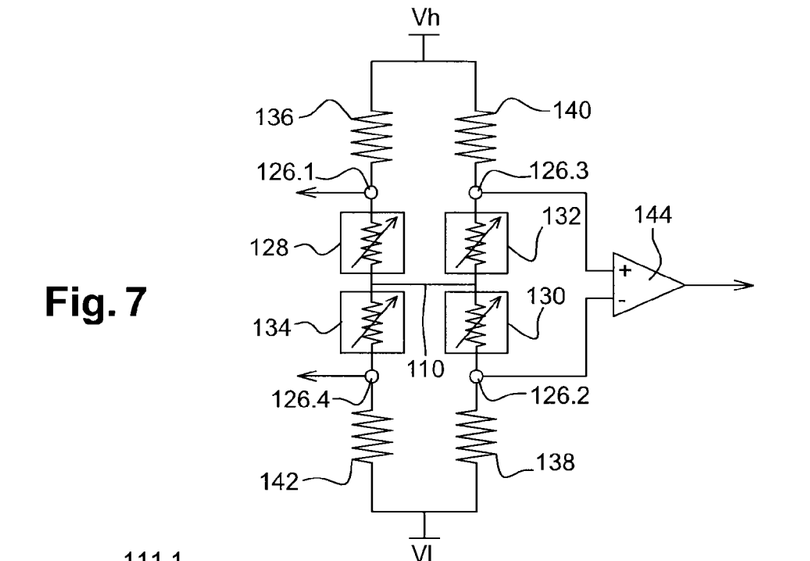
FIG. 7 shows the wiring diagram of an exemplary circuit formed by the photon radiation detector according to the first embodiment.

FIG. 7 shows the wiring diagram of an exemplary circuit formed by the detector 100.

This circuit comprises four variable resistors referenced 128, 130, 132 and 134. Each of the variable resistors 128 and 130 corresponds to the variable resistor formed by one of both arms of the spiral of the support 106 on which the antennas 102 of the first array are disposed, and each of the variable resistors 132 and 134 corresponds to the variable resistor formed by one of both arms of the spiral of the support 106 on which the antennas 104 of the second array are disposed. First terminals of each of the variable resistors 128, 130, 132 and 134 are electrically connected to one another, which corresponds to the fact that the first ends of the four arms of the spiral are electrically connected to one another at the centre 110 of the spiral. Second terminals of each of the variable resistors 128, 130, 132 and 134 respectively corresponds to the second ends 111.1-111.4 of the arms of the spiral, and are therefore respectively connected to the electrically conductive blocks 126.1-126.4.

The detector 100 also comprises four electrical resistors 136, 138, 140 and 142, forming four load resistors having fixed and mutually equal values, located outside the suspended structure, for example in the read circuit 120. Each of these four electrical resistors 136, 138, 140, 142 comprises a first terminal electrically connected to one of the electrically conductive blocks 126.1-126.4. A first bias voltage Vh is applied on second terminals of the resistors 136 and 140, and a second bias voltage Vl is applied on second terminals of the resistors 138 and 142. In this configuration, and for reasons of symmetry, the voltage at the centre 110 of the spiral is always equal to (Vh+Vl)/2. The block 124 is advantageously electrically connected to the read circuit 120 in order to improve the measurements performed.

Thus, in this circuit, the current going through the latter is supplied by a voltage source associated with the four resistors having identical loads 136, 138, 140 and 142 and outputting the bias voltages Vh and Vl. These four load resistors 136, 138, 140 and 142 therefore connect the high and low terminals of the bias voltages to the four points of the circuit corresponding to the four electrically conductive blocks 126.1-126.4.

When the variable resistors 132 and 134 (respectively 128 and 130) vary by the same value, since both corresponding arms substantially perform a same absorption, the variations in the voltage at the block 126.3 or 126.4 (respectively 126.2 or 126.1) are then a function of the absorbed flux in each of the polarizations, independently.

This circuit enables the measurement of the flux of each of the wave components, that is each of the components of the polarization of the light received, by the measurement of the voltage at the electrically conductive blocks 126.1 (or 126.2) and 126.4 (or 126.3), the voltage obtained at the block 126.1 (or 126.2) corresponding to the component of the light polarization measured by the first array of antennas 102, and that obtained at the block 126.4 (or 126.3) corresponding to the component of the light polarization measured by the second array of antennas 104, to be simultaneously performed, with respect to the ground.

In this exemplary embodiment, the detector 100 further comprises an operational amplifier 144 the inputs of which are connected to the electrically conductive blocks 126.2 and 126.3. The differential signal measured by this amplifier 144 is representative of the polarization degree of the light received by the detector 100. This amplifier 144 corresponds to one of the elements of the read circuit 120. Alternatively, the differential signal measured could correspond to the voltage difference measured between the electrically conductive blocks 126.1 and 126.4. Alternatively, it is possible for the detector 100 to perform only the measurement of the absolute values of the polarization components, or only the differential measurement representative of the light polarization degree.

The simultaneous measurement of the absolute value of each of the light polarization components, as well as the difference between both components via the differential amplifier 144, is possible thanks to the redundancy of information associated with the fact that the reading points correspond to the electrically conductive blocks 126.1-126.4.

Advantageously, the optical cavity 122 formed between the support 106 and the read circuit 120 can correspond to a resonant cavity obtained by disposing on the read circuit 120, a reflecting material 123 able to reflect the received light towards the support 106, and therefore towards the antennas 102, 104. This reflecting material 123 corresponds for example to a metal material, such as gold, silver or aluminium, or a dielectric material with a strong index, such as glass, quartz or even germanium or silicon when the detector 100 is cooled to operate at a low temperature. The distance between this reflecting material 123 and the antennas 102, 104 is equal to about a quarter wavelength ($\lambda/4$) of the light intended to be detected. Thus, the detection efficiency of the detector 100 is improved. This reflecting material can also be used to also form a ground circuit and an electromagnetic shield, and enables in this case any disturbance to be prevented, regarding the detection, by conductors passing on the same plane as the absorbing elements.

Figure 8:
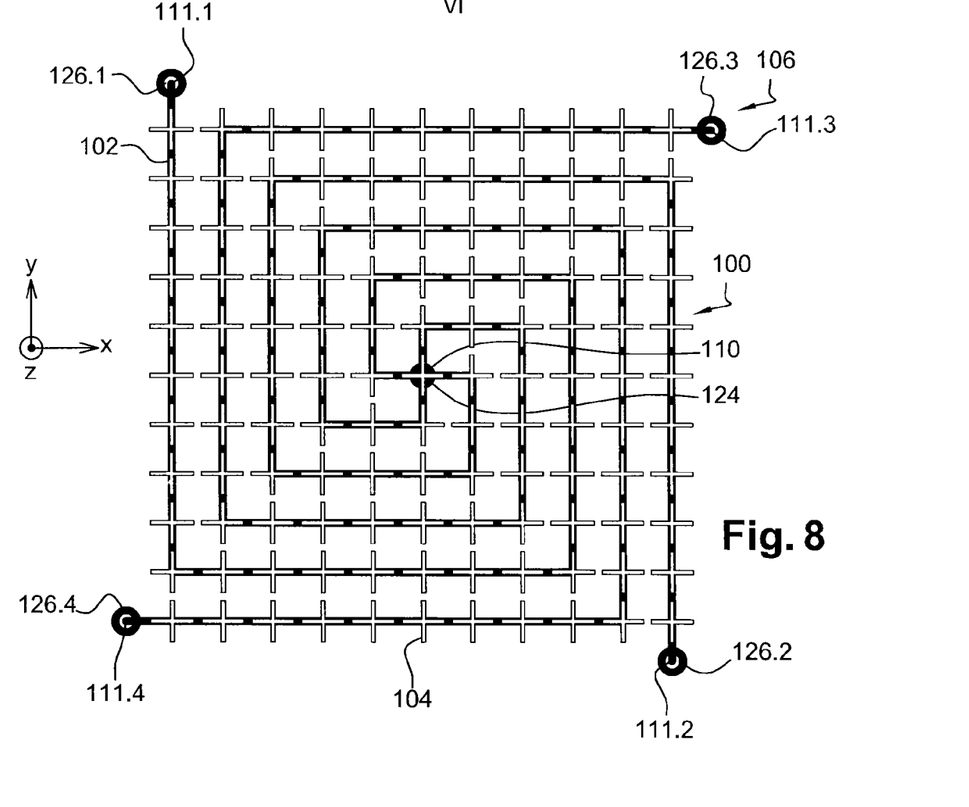
FIG. 8 shows a top view of the photon radiation detector according to a second embodiment.

FIG. 8 shows a top view of the detector 100 according to a second embodiment. In this FIG. 8, the support 106 and the antennas 102 and 104 disposed on the support 106 can be seen.

In this second embodiment, the first array of antennas 102 and the second array of antennas 104 are not formed by straight segments directed perpendicular to one another. In this second embodiment, the patterns of the antennas of the first array and the second array are all similar. Thus, antennas 102 and 104 having similar patterns are disposed on the four arms of the spiral formed by the support 106. In the second embodiment herein described, the antennas 102 and 104 each have a cross pattern, that is they each comprise two segments of conductive material (metal, supraconductor or even semiconductor) having substantially similar dimensions and crossing substantially perpendicular to one another at the centre. Moreover, a length of each of the segments of the antennas is substantially equal to half a wavelength of the photon radiation intended to be detected. Thus, each of the antennas 102 and 104 is able to detect a same wavelength according to both light polarization components.

The portions of material forming the support 106 are adapted to support the segments of material of the antennas 102 and 104. Thus, each of the arms of the spiral of the support 106 is formed by a succession of portions of material corresponding to the pattern of the antennas to be supported, here a succession of cross-shaped portions.

The other elements of the detector 100 according to the second embodiment are similar to those described previously for the detector 100 according to the first embodiment.

Such a detector 100 according to this second embodiment enables a differential reading of the signal produced by the luminous flux absorbed by the antennas to be performed, since the antennas of both arrays of antennas have, in both orthogonal directions, the same characteristic size and the same surface impedance, and therefore detect a same wavelength.

Other antenna patterns can be considered, for example having a loop, polygon, round, square, triangle, "Y" shape, etc.

Figure 9:
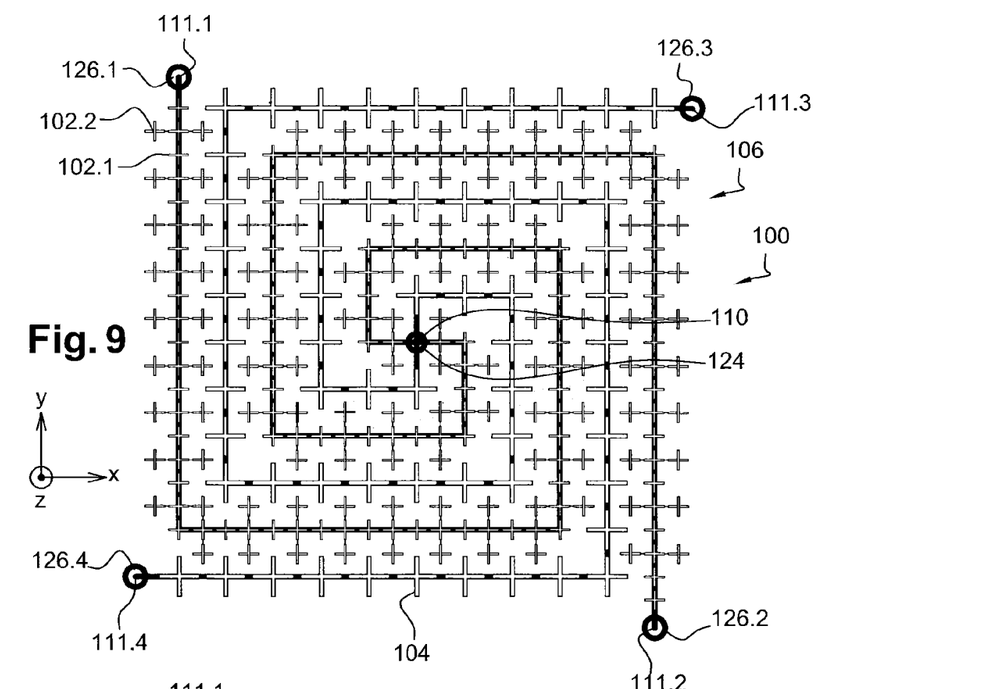
FIG. 9 shows a top view of the photon radiation detector according to a third embodiment.

FIG. 9 shows a top view of the detector 100 according to a third embodiment. In this FIG. 9, the support 106 and the antennas 102 and 104 disposed on the support 106 can be seen.

As in the second embodiment described previously, each of the antennas 102 and 104 corresponds to two crossing segments of a conductive material by forming a cross pattern. Nevertheless, in this third embodiment, the dimensions of the antennas 102 of the first array are different from those of the antennas 104 of the second array. In the example of FIG. 9, the dimensions of the antennas 102 are smaller than those of the antennas 104. This dimension difference implies that the wavelengths detected by both arrays of antennas 102 and 104 are different. Moreover, in the example of FIG. 9, some antennas referenced 102.2 are juxtaposed on the antennas referenced 102.1 being on the main axes of the arms of the spiral. The portions of the support 106 on which these antennas 102.2 are disposed are however parts of the arms of the spiral on which the antennas of the first array of antennas 102 are disposed.

Figure 10:
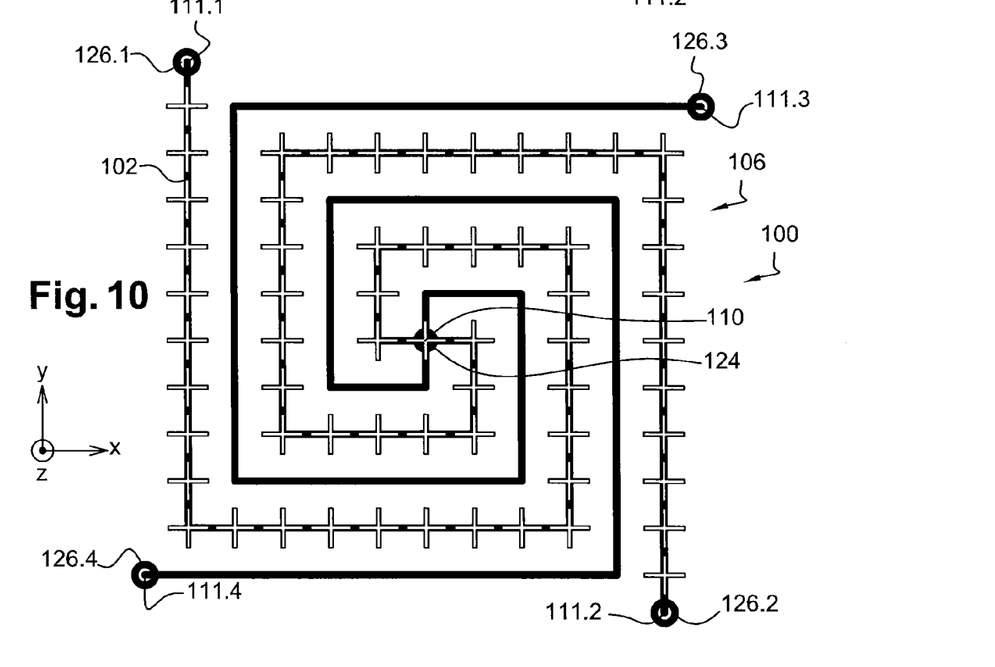
FIG. 10 shows a top view of the photon radiation detector according to a fourth embodiment.

FIG. 10 shows a top view of the detector 100 according to a fourth embodiment. In this FIG. 10, the support 106 and the antennas 102 disposed on the support 106 can be seen.

In this fourth embodiment, the detector 100 comprises a single array of antennas 102 disposed on the support 106. Thus, two of the four arms of the spiral formed by the support 106 are not covered with antennas, the first array of antennas 102 being disposed on the other two arms of the spiral formed by the support 106. In the example described here, the antennas 102 of the first array each have a cross pattern.

Thus, the detector 100 according to the fourth embodiment allows the absolute discrimination of the signal coming from the optics (signal absorbed by the antennas 102) from the common mode signal that can come from thermal fluctuations, electromagnetic disturbances or from the micro-vibrations experienced by the detector 100, therefore performing a rejection of these common modes.

As an alternative to all these embodiments described previously, it is possible for the antennas (of the first and/or second arrays) to be disposed only on part of the length of the arms of the spiral formed by the support 106. In this case, it is possible that only these parts of the arms on which the antennas are disposed comprise a resistive material.

Furthermore, it is also possible for the antennas not to be made on the support 106, but under the support 106 such that these antennas are disposed between the support 106 and the read circuit 120, and/or on the sides of the arms formed by the support 106.

In the embodiments described previously, each of the antennas 102, 104 corresponds to a segment of material or several segments of materials forming a pattern for example a cross pattern. In an alternative embodiment, each of the antennas 102 and/or 104 can correspond to several segments of material disposed parallel to one another, or forming several patterns disposed next to each other. Thus, on each arm of the spiral formed by the support 106, the segments of material of the antennas form several spirals interlocked with each other. Such an alternative embodiment enables the electrical resistance of the antennas to be reduced without having to increase the thickness of the segments of material forming the antennas, this thickness being generally restricted according to the implemented production techniques. Thus, it is possible to improve the adaptation of antennas to the wave absorption.

Whatever the embodiment, each of the material portions of the support 106 can be made as a stack of two materials, one acting as a mechanical bearing and the other acting as a resistive material. In this case, the antennas are disposed on the side of the resistive material so as to have a thermal contact between the material of the antennas and the resistive material of the support.

Furthermore, the presence or absence of a resonant cavity under the support 106 such as described previously for the first embodiment can also be applied for the other embodiments.

Whatever the embodiment, the detector 100 can operate at room temperature, or be cooled to operate at a very low temperature (100 mK, or less than 10 mK). Furthermore, the detector can be vacuum encapsulated.

Figure 11:
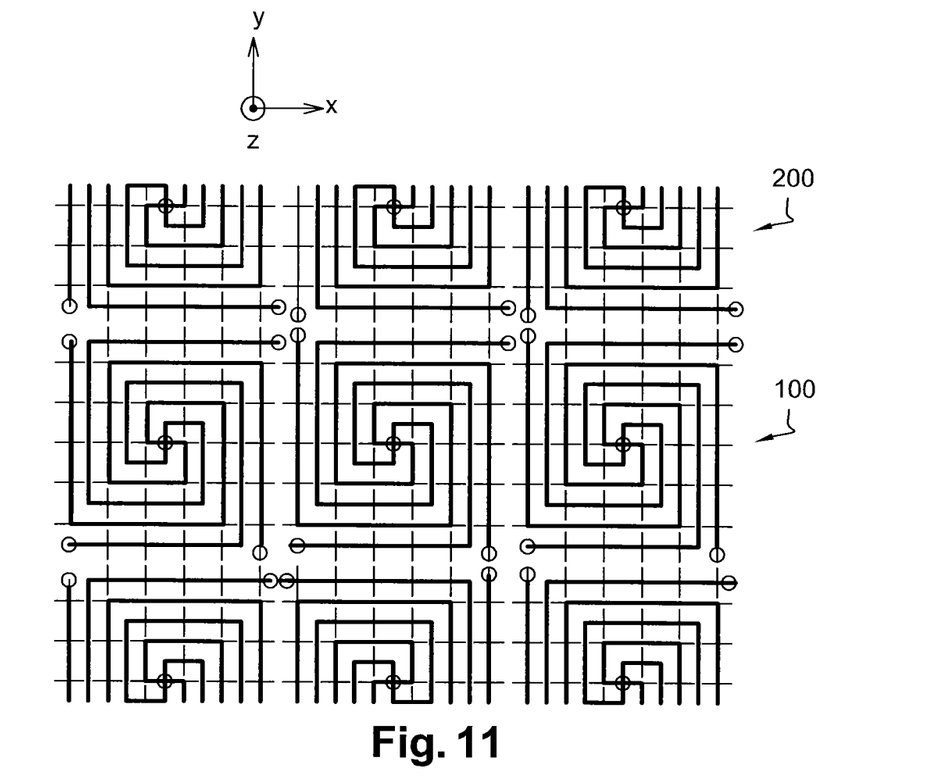
FIG. 11 shows a top view of a detection device according to a particular embodiment.

In all the embodiments described previously, the detector 100 can correspond to an individual measurement element, or correspond to one of the pixels of a matrix formed by juxtaposing several detectors 100 next to each other, being part of a detection device 200 such as shown in FIG. 11. The read circuits of the detectors 100 of this matrix can be located in a same substrate under the detection antennas and the antenna supports, and possibly under the reflecting materials if these detectors comprise resonant optical cavities.

The invention claimed is:

1. A photon radiation detector, comprising at least:
   a support forming a plane spiral with at least four arms, each arm being suspended between a first end common to the four arms and a second end, each arm comprising at least one resistive material, the resistivity of which varies as a function of a temperature of the resistive material, and which is electrically connected to the first and second ends of said arm,
   a first array of antennas sensitive to at least one first physical parameter of the photon radiation and in thermal contact with the resistive material of two of the four arms, called first arms,
   wherein the second end of said each arm of the at least four arms is electrically connected to a read circuit of the detector and thermally bonded to a first heat sink, and
   wherein the first end common to the four arms is thermally bonded to a second heat sink.

2. The photon radiation detector according to claim 1, wherein the first end common to the four arms of the spiral formed by the support corresponds to the centre of the spiral.

3. The photon radiation detector according to claim 1, wherein the first end common to the four arms is electrically connected to the read circuit.

4. The photon radiation detector according to claim 1, wherein the thermal bond between the first end common to the four arms and the second heat sink is formed by a first block also forming a first mechanical bearing between the support and the read circuit.

5. The photon radiation detector according to claim 1, wherein the second end of said each arm of the at least four arms is electrically connected to the read circuit and/or thermally bonded to the first heat sink by a second block forming a second mechanical bearing between the support and the read circuit.

6. The photon radiation detector according to claim 1, further comprising a second array of antennas sensitive to at least one second physical parameter of the photon radiation and in thermal contact with the resistive material of the other two of the four arms, called second arms.

7. The photon radiation detector according to claim 6, wherein the first and second physical parameters are two components of the photon radiation or two different wavelengths of the photon radiation.

8. The photon radiation detector according to claim 6,
   wherein the first and second physical parameters are two components orthogonal to one another of a linear polarization of the photon radiation,
   wherein antennas of the first array of antennas are dipole antennas formed by first segments of an electrically conductive material directed parallel to a first direction,
   wherein antennas of the second array of antennas are dipole antennas formed by second segments of the electrically conductive material directed parallel to a second direction, the first and second directions being perpendicular to one another, and
   wherein a length of each segment of the first segments and each segment of the second segments is equal to half a wavelength of the photon radiation intended to be detected by the antennas of the first array of antennas and the antennas of the second array of antennas, respectively.

9. The photon radiation detector according to claim 8, wherein a length of each segment of the first segments is equal to a length of each segment of the second segments.

10. The photon radiation detector according to claim 6, wherein each antenna of the first and second arrays of antennas comprises two segments having similar dimensions and crossing perpendicular to one another a centre thereof by forming a cross pattern, and a length of each segment of the two segments of each of the antennas is equal to half a wavelength of the photon radiation intended to be detected.

11. The photon radiation detector according to claim 10, wherein the length of said each segment of the two segments of each of the antennas of the first array of antennas is equal to the length of said each segment of the two segments of each of the antennas of the second array of antennas, or wherein the length of said each segment of the two segments of each of the antennas of the first array of antennas is different from the length of said each segment of the two segments of each of the antennas of the second array of antennas.

12. The photon radiation detector according to claim 6, wherein the antennas of the second array of antennas are disposed on the second arms.

13. The photon radiation detector according to claim 6, wherein the antennas of the second array of antennas comprise at least one metal or superconductor or semiconductor material.

14. The photon radiation detector according to claim 6, wherein a surface resistance of each antennas of the second array of antennas is between about 20Ω and 2,000Ω.

15. The photon radiation detector according to claim 1, wherein the resistive material of the other two of the four arms, called second arms, is in thermal contact with no antenna.

16. The photon radiation detector according to claim 15, wherein each antenna of the first array of antennas comprises two segments having similar dimensions and crossing perpendicular to one another at a centre thereof by forming a cross pattern, and a length of each segment of the two segments of the antennas is equal to half a wavelength of the photon radiation intended to be detected.

17. The photon radiation detector according to claim 1, wherein the antennas of the first array of antennas are disposed on the first arms.

18. The photon radiation detector according to claim 1, wherein the support comprises silicon further forming the resistive material, and/or wherein the antennas of the first array of antennas comprise at least one metal or superconductor or semiconductor material.

19. The photon radiation detector according to claim 1, wherein a surface resistance of each of the antennas of the first array of antennas is between about 20Ω and 2,000Ω, and/or wherein a surface resistance of the resistive material is higher than about 10 kΩ/square.

20. The photon radiation detector according to claim 1, further comprising a reflector disposed between antennas of the first array of antennas and the read circuit such that a distance between the reflector and the antennas is equal to about a quarter wavelength of the photon radiation intended to be detected.

21. The photon radiation detector according to claim 1, further comprising one or more portions of a dielectric material disposed between antennas of the first array of antennas and the resistive material of the support.

22. A device for detecting a photon radiation, comprising a matrix of detectors each according to claim 1.

* * * * *